(12) United States Patent
Bufe, III et al.

(10) Patent No.: US 9,519,686 B2
(45) Date of Patent: *Dec. 13, 2016

(54) CONFIDENCE RANKING OF ANSWERS BASED ON TEMPORAL SEMANTICS

(71) Applicant: International Business Machines Corporation, Armonk, NY (US)

(72) Inventors: John P. Bufe, III, Washington, DC (US); Donna K. Byron, Petersham, MA (US); Alexander Pikovsky, Lexington, MA (US); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 250 days.

This patent is subject to a terminal disclaimer.

(21) Appl. No.: 14/248,762

(22) Filed: Apr. 9, 2014

(65) Prior Publication Data

US 2015/0293917 A1     Oct. 15, 2015

(51) Int. Cl.
*G06F 15/18* (2006.01)
*G06F 17/30* (2006.01)
*G06N 99/00* (2010.01)

(52) U.S. Cl.
CPC ..... *G06F 17/3053* (2013.01); *G06F 17/30401* (2013.01); *G06F 17/30528* (2013.01); *G06F 17/30551* (2013.01); *G06F 17/30554* (2013.01); *G06F 17/30867* (2013.01); *G06N 99/005* (2013.01)

(58) Field of Classification Search
CPC ............ G06G 17/3053; G06G 17/30551; G06G 17/30867

USPC .................... 706/12; 707/723, 725
See application file for complete search history.

(56) References Cited

U.S. PATENT DOCUMENTS

| | | |
|---|---|---|
| 7,676,520 B2 | 3/2010 | Liu et al. |
| 2009/0287678 A1 | 11/2009 | Brown et al. |
| 2011/0125734 A1 | 5/2011 | Duboue et al. |
| 2013/0007055 A1 | 1/2013 | Brown et al. |
| 2013/0018652 A1 | 1/2013 | Ferrucci et al. |

(Continued)

OTHER PUBLICATIONS

Kalyanpur, Aditya et al. "Structured Data and Inference in DeepQA," IBM Journal of Research and Development 56 No. 3.4 (2012), 14 pages.*

(Continued)

*Primary Examiner* — Kakali Chaki
*Assistant Examiner* — Brian M Smith
(74) *Attorney, Agent, or Firm* — Francis Lammes; Stephen J. Walder, Jr.; Reza Sarbakhsh

(57) ABSTRACT

A mechanism is provided, in a data processing system comprising a processor and a memory configured to implement a question and answer system (QA), for providing confidence rankings based on temporal semantics. Responsive to receiving an input question, a set of candidate answers is identified from a knowledge domain based on a correlation between an identified one or more predicates and an identified one or more arguments to the knowledge domain. A confidence score is associated with each of the candidate answers and each confidence score associated with each candidate answer is refined based on a set of temporal characteristics identified in the input question. A set of temporally refined candidate answers is then provided to the user.

6 Claims, 6 Drawing Sheets

(56) References Cited

U.S. PATENT DOCUMENTS

| | | |
|---|---|---|
| 2013/0066886 A1 | 3/2013 | Bagchi et al. |
| 2013/0124653 A1 | 5/2013 | Vick et al. |
| 2013/0158984 A1 | 6/2013 | Myslinski et al. |
| 2015/0269152 A1* | 9/2015 | Rekhi ................ G06F 17/3053 707/748 |

OTHER PUBLICATIONS

Yu, Philip et al. "On the temporal dimension of search," Proceedings of the 13th International World Wide Web conference on Alternate track papers & posters, ACM 2004, 2 pages.*

Gondek, DC et al. "A framework for merging and ranking of answers in DeepQA." IBM Journal of Research and Development 56 No. 3.4 (2012), 12 pages.*

Chu-Carroll, Jennifer et al. "Finding needles in the haystack: Search and candidate generation" IBM Journal of Research and Development 56 No. 3.4 (2012), 12 pages.*

Ferrucci, D.A., "Introduction to 'This is Watson'," IBM Journal of Research and Development 56 No. 3.4 (2012), 15 pages.*

Dong, Anlei et al. "Towards recency ranking in web search," Proceedings of the third ACM international conference on Web search and data mining. ACM, 2010, 10 pages.*

Efron, Miles es al. "Estimation methods for ranking recent information," Proceedings of the 34th international ACM SIGIR conference on Research and development in Information Retrieval. ACM, 2001, 10 pages.*

Oh, J.-H. et al., "Why question answering using sentiment analysis and word classes." Proc. of the 2012 Joint Conf. on Emprical Methods in Natural Language Processing and Computational Natural Language Learning (2012) pp. 368-378.*

List of IBM or Patent Applications Treated as Related (Appendix P), Sep. 22, 2015, 2 pages.

List of IBM Patents or Applications Treated as Related (Appendix P), Feb. 11, 2016, 2 pages.

High, Rob, "The Era of Cognitive Systems: An Inside Look at IBM Watson and How it Works", IBM Corporation, Redbooks, 2012, 16 pages.

Jean-Louis, Ludovic et al., "Using temporal cues for segmenting texts into events", Proceedings of the 7th International Conference on Advances in Natural Language Processing (IceTAL'10), Reykjavik, Iceland, Aug. 16-18, 2010, pp. 150-161. (Abstract Only).

Taboada, Maite et al., "Lexicon-Based Method for Sentiment Analysis", http://cgi.sfu.ca/~mtaboada/docs/Taboada_etal_SO-CAL.pdf, Submission received: Dec. 14, 2009, revised submission received: Aug. 22, 2010, Accepted for publication Sep. 28, 2010, 2011 Association for Computational Linguistics, 42 pages.

Yuan, Michael J., "Watson and healthcare, How natural language processing and semantic search could revolutionize clinical decision support", IBM developerWorks, IBM Corporation, Apr. 12, 2011, 14 pages.

List of IBM or Patent Applications Treated as Related (Appendix P), 1 page.

Hawksey, Martin, "Sentiment Analysis of tweets: Comparison of Virall-and Text-Processing Sentiment APIs", MASHe, https://mashe.hawksey.info/2011/11/sentiment-analysis-of-tweets-comparison-of-viralheat-and-text-processing-sentiment-api/, Nov. 10, 2011, 4 pages.

Nakagawa, Tetsuji, "Dependency Tree-based Sentiment Classification using CRFs with Hidden Variables", Association for Computational Linguistics, Human League Technologies: The 2010 Annual Conference of the North American Chapter of the ACL, Los Angeles, California, Jun. 2010, pp. 786-794.

* cited by examiner

CONFIDENCE RANKING OF ANSWERS BASED ON TEMPORAL SEMANTICS

BACKGROUND

The present application relates generally to an improved data processing apparatus and method and more specifically to mechanisms for providing confidence rankings based on temporal semantics.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a data processing system comprising a processor and a memory configured to implement a question and answer system (QA), is provided for providing confidence rankings based on temporal semantics. The illustrative embodiment identifies a set of candidate answers from a knowledge domain based on a correlation between an identified one or more predicates and an identified one or more arguments to the knowledge domain in response to receiving an input question. The illustrative embodiment associates a confidence score with each of the candidate answers. The illustrative embodiment refines each confidence score associated with each candidate answer based on a set of temporal characteristics identified in the input question. In the illustrative embodiment, each confidence score is refined based on the set of temporal characteristics using a temporal confidence function computed against a temporal interval between a reference time of the question and a respective reference time associated with the set of candidate answers. The illustrative embodiment provides a set of temporally refined candidate answers to the user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
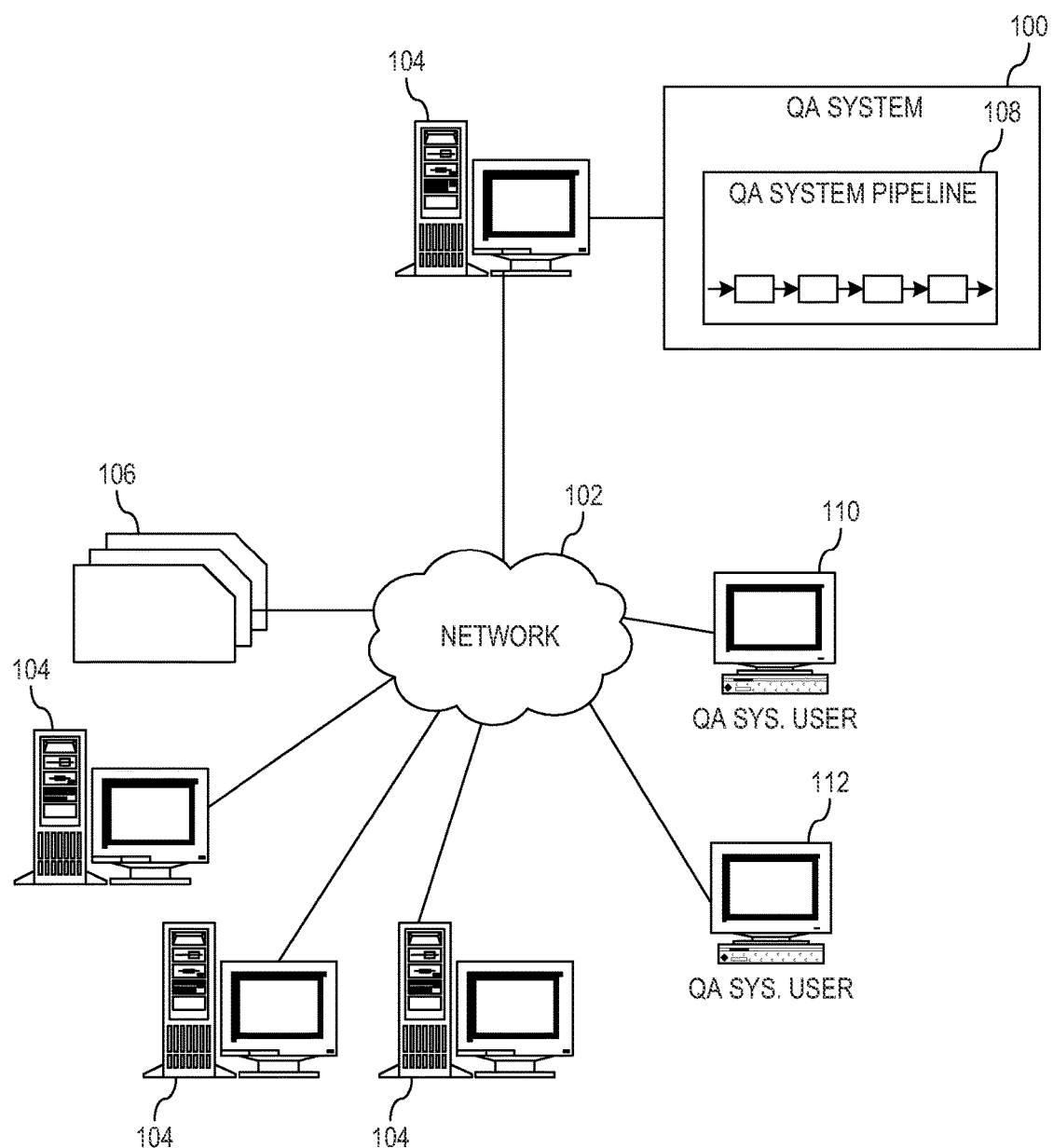
FIG. 1 is an example diagram of a distributed data processing system in which aspects of a Question and Answer system of the illustrative embodiments may be implemented.

Question and Answer (QA) systems, such as IBM's Watson™ QA system, require a significant amount of compute power to analyze a natural language question and determine the results from candidate findings. Further, in a question and answering system such as IBM's Watson™ QA system, for any knowledge domain, corpora, or corpus, many questions may be answered via a fact that is true once and for all, such as the birthdate or birthplace of a famous person, or the location of a famous event. However, other questions involve information that changes over time or based on other contextual factors, for example, facts that are true only during a particular time period, or relations such as roles, in which the person taking on that role varies over time. When evaluating such relations, a QA system should take their unique temporal characteristics into consideration. With each new knowledge domain, the temporal characteristics of knowledge-domain specific relations must be modeled within the knowledge resources of QA system. Asking a question like "What is the rating of a treasury bond?" for example is very similar to asking "Who is the president of the US?"

The impact on a QA system is that potential answers found by the QA system need to be viewed in light of temporal characteristics associated with the question. An answer, captured in a document with static content, will often become less accurate over time. When asked "Who is the president of the US?", if the ingested corpus was collected more than 4 years ago and no new info has been added since, the QA system's confidence that the document comprises a correct answer should gradually fade and after 8 years the confidence should be zero. Achieving the best possible answer for such questions requires post processing of regular static search results.

Thus, the illustrative embodiments provide for altering the confidence scores of answers produced by a QA system based on temporal sensitivity of predicates and/or arguments associated with the predicates in the questions. Both one or more predicates and one or more arguments associated with the one or more predicates are required for defining temporal characteristics, because the exact object under investigation changes the semantics of temporal operators. For example, a confidence that a retrieved stock price found in a news article should fade relatively quickly, while the confidence in a person's place of residence should fade more slowly. As another example, the person filling the role of President of the US changes every four to eight years, while the President of a town's school board is elected every year. Thus, some predicate/argument pairs are more time sensitive/volatile than others.

With the mechanisms of the illustrative embodiments, when a user submits a question to the QA system, the QA system parses the question using natural language processing (NLP) for semantic keywords identifying one or more predicates, one or more arguments associated with the one or more predicates, and a set of temporal characteristics. The QA system then makes an initial correlation between the identified one or more predicates and the identified one or more arguments associated with the one or more predicates to a knowledge domain, corpora, or corpus of natural language data in order to identify a collection of candidate answers. The QA system then associates a confidence score with each of the candidate answers. That is, the QA system analyzes each candidate answer as to how close to the candidate answer matches a set of criteria, which is the identified one or more predicates and the identified one or more arguments associated with the one or more predicates. For example, if the candidate answer meets 60 percent of the criteria, then the QA system associates a confidence score of 60. Once the QA system scores all the candidate answers, the QA system produces an initial ranking of the candidate answers.

In order to refine the initial ranking of the candidate answers based on the set of temporal characteristics, the QA system applies one or more of a set of temporal confidence functions maintained by the QA system. The QA system applies one or more of the set of temporal confidence functions, computed against the temporal interval between a reference time, i.e. the set of temporal characteristics identified from the question and a date/time stamp associated with the candidate answers. Temporal confidence functions are keyed on predicate/argument tuples because the exact object under investigation changes the semantics of temporal operators. The temporal confidence function may be any sort of real-valued function and the QA system may apply the confidence function against any reference time. Exemplary temporal confidence functions may include:

Linear decay: a linear relation in which the confidence fades smoothly over time, so that older data is considered as less confident. The decay rate may be tuned for each predicate/argument tuple.

Step decay: the confidence value may decay somewhat over time, but then decline sharply when the evidence is more than a predetermined number of years old.

Variable decay: based on some more complex decay algorithm which fits better to the knowledge domain, corpora, or corpus at hand.

The library of temporal confidence functions may be populated in a plurality of ways, such as hand-coding by software engineers, inferred via machine learning techniques, or the like.

Once the QA system applies the one or more of the set of temporal confidence functions, the QA system recomputes the rank of each of the candidate answers using a distance function based on the temporal semantics found both in the question and the candidate answer text, as well as a relation of the question and candidate answer to the present time. That is, while analyzing unstructured text, different segments may refer to various points in time. When ascertaining the sentiment of this text, a specific reference point in time may be of particular interest and therefore only particular segments of text will provide insight. The QA system analyzes unstructured text from a certain temporal perspective, such that the sentiment of phrases or segments of text referring to this specific reference point will be weighted higher and others weighted lower (or excluded) such that the reported sentiment more accurately reflects the focus. By identifying a collection of points and/or ranges of time as a reference set, each phrase or text segment will be analyzed for temporal indicators and given a distance score in relation to the nearest point of the reference set. The QA system may then either scale and/or normalize this score with a user-configurable function. The result of this function will be a value greater than zero and may be used by the QA system to multiply the final sentiment score for the segment of text, effectively weighting the text with respect to the reference set. The QA system utilizes this final weighting to rank the candidate answers in descending order by confidence.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java™, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
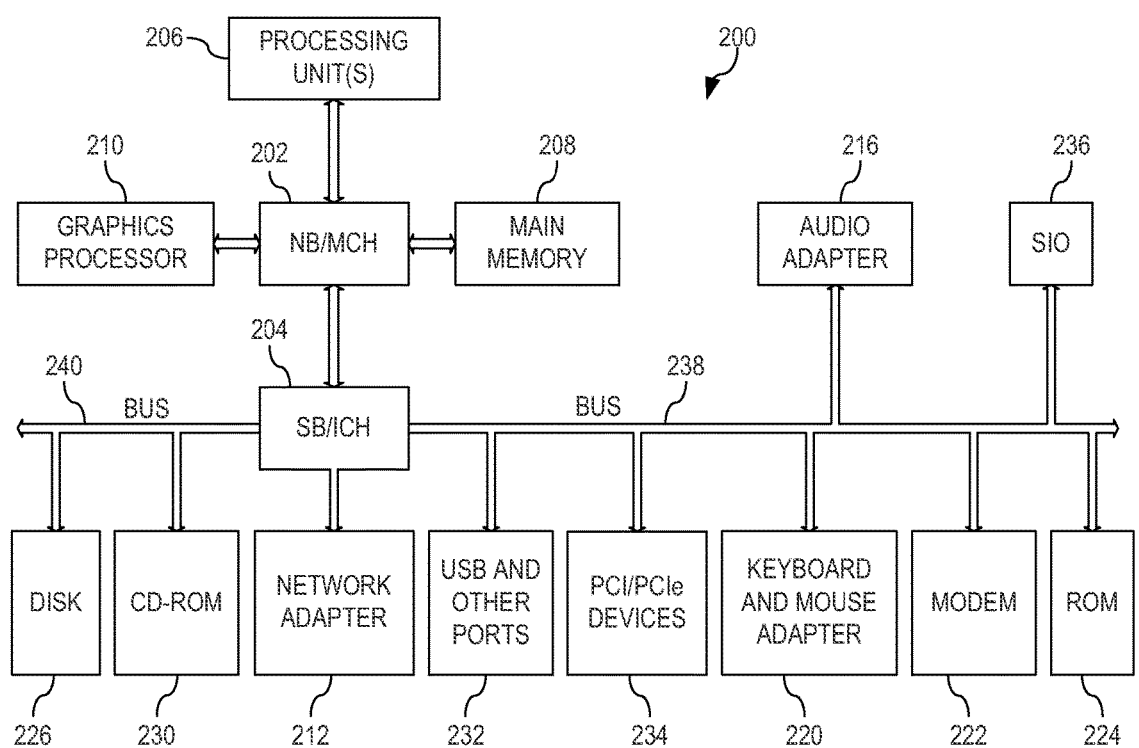
FIG. 2 is an example block diagram of a computing device in which aspects of the illustrative embodiments may be implemented.
Figure 3:
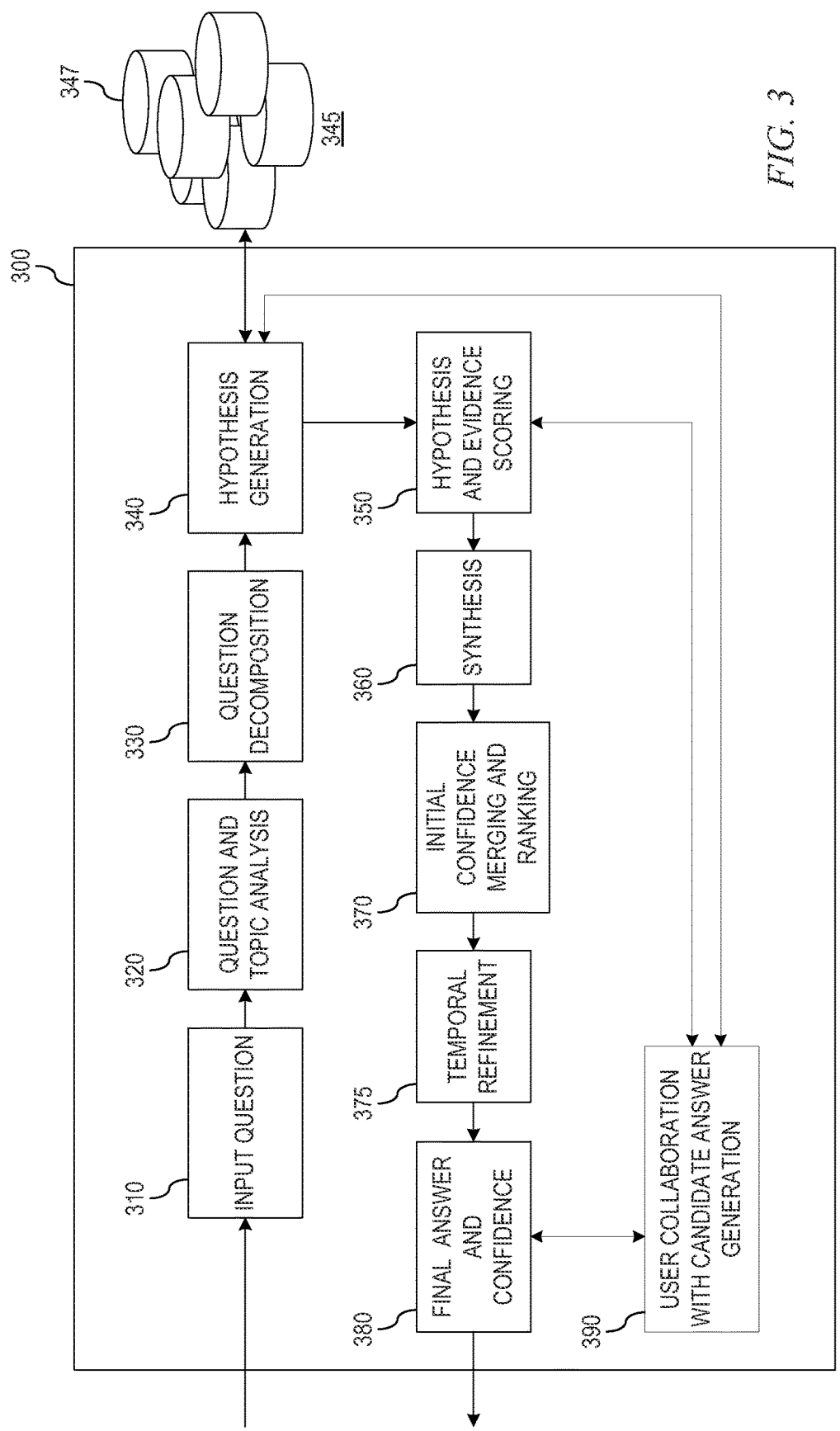
FIG. 3 illustrates a QA system pipeline for processing an input question in accordance with one illustrative embodiment.

The illustrative embodiments may be utilized in many different types of data processing environments. FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to analyzing natural language questions to determine missing information in order to improve accuracy of answers. Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify this question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of data 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular knowledge domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM® Corporation website, IBM Redbooks®, and the like. For example, information about the Watson™ QA system can be found in Yuan et al., "Watson and Healthcare," IBM developerWorks®, 2011 and "The Era of Cognitive Systems: An Inside Look at IBM Watson and How it Works" by Rob High, IBM Redbooks®, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-390 through which the QA system operates to analyze an input question and generate a response. In an initial input question stage 310, the QA system receives an input question that is presented in a natural language format. That is, a user may input, via a user interface, an input question for which the user wishes to obtain an answer, e.g., "What is the rating of a U.S. treasury bond today?" or "Who was the president of the US in 2009?" In response to receiving the input question, the next stage of the QA system pipeline 300, i.e. the question and topic analysis stage 320, parses the input question, using natural language processing (NLP) techniques, for semantic keywords identifying one or more predicates, one or more arguments associated with the one or more predicates, and a set of temporal characteristics from the input question, and classifies the major features according to types, e.g., names, dates, or any of a plethora of other defined topics. For example, in the first example question above, the term "what" may be associated with a topic for "bond" indicating that the identity of a treasury bond is being sought, the terms "U.S.," "treasury," and "rating" may be identified as a word indicative of declarative or argument criteria, and "today" may be indicative of the temporal characteristics. In the second example question, the term "who" may be associated with the topic of "president" indicating that the identity of a president is being sought, "US" may be identified as a word indicative of declarative or argument criteria, and "2009" may be indicative of the temporal characteristics.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more knowledge domains or databases storing information about the electronic texts, documents, articles, websites, and the like, that make up the corpora of data/information 345. That is, these various sources themselves, collections of sources, and the like, may represent different corpus 347 within the corpora 345. There may be different corpus 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM® Redbooks® documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, the hypothesis. Further, hypothesis and evidence scoring stage 350 also determines whether there is missing information and or ambiguous information that would increase the scoring of each candidate answer. That is, if a given candidate answer meets one or more of the annotators associated with the received question but has an additional annotator that is not identifiable or is unclear in the corpus of data/information 345, then hypothesis and evidence scoring stage 350 associates this missing or ambiguous information with the given candidate answer. Each reasoning algorithm in hypothesis and evidence scoring stage 350 generates a score based on the analysis it performs which indicates a measure of relevance of the individual portions of the corpus of data/information extracted by application of the queries, a measure of the missing or ambiguous information, as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by an initial confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate an initial ranked listing of hypotheses/candidate answers (hereafter simply referred to as "initial candidate answers").

From the ranked listing of the initial candidate answers, in a temporal refinement stage 375, the QA system applies one or more of a set of temporal confidence functions maintained by the QA system in order to refine the initial candidate answers based on a set of temporal characteristics. The QA system applies one or more of the set of temporal confidence functions, computed against the temporal interval between a reference time, i.e. the set of temporal characteristics identified from the question, and a date/time stamp associated with the candidate answers. If no temporal characteristic is identifiable from the question, the QA system utilizes a current time as the temporal characteristic. Temporal confidence functions are keyed on predicate/argument tuples because the exact object under investigation changes the semantics of temporal operators. The temporal confidence function may be any sort of real-valued function and the QA system may apply the confidence function against any reference time, such as a current time, a user-identified point in time, or the like. Exemplary temporal confidence functions may include:

Linear decay: a linear relation in which the confidence fades smoothly over time, so that older data is considered as less confident. The decay rate may be tuned for each predicate/argument tuple.

Step decay: the confidence value may decay somewhat over time, but then decline sharply when the evidence is more than a predetermined number of years old.

Variable decay: based on some more complex decay algorithm which fits better to the knowledge domain, corpora, or corpus at hand.

The library of temporal confidence functions may be populated in a plurality of ways, such as hand-coding by software engineers, inferred via machine learning techniques, or the like.

Once the QA system applies the one or more of the set of temporal confidence functions, the QA system recomputes the rank of each of the candidate answers using a distance function based on the temporal semantics found both in the question and the candidate answer text, as well as a relation of the question and candidate answer to the present time. That is, while analyzing unstructured text, different segments may refer to various points in time. When ascertaining the sentiment of this text, a specific reference point in time may be of particular interest and therefore only particular segments of text will provide insight. The QA system analyzes unstructured text from a certain temporal perspective, such that the sentiment of phrases or segments of text referring to this specific reference point will be weighted higher and others weighted lower (or excluded) such that the reported sentiment more accurately reflects the focus. By identifying a collection of points and/or ranges of time as a reference set, each phrase or text segment will be analyzed for temporal indicators and given a distance score in relation to the nearest point of the reference set. The QA system may then either scale and/or normalize this score with a user-configurable function. The result of this function will be a value greater than zero and may be used by the QA system to multiply the final sentiment score for the segment of text, effectively weighting the text with respect to the reference set.

As an example of the distance function applied in a temporal refinement stage 375, the initial candidate answers provided in initial confidence merging and ranking stage 370 to the question of "What is the rating of a U.S. treasury bond today?" may be, for example:

1. The bond is going to mature in two weeks. (Initial confidence of 5)
2. Its current value is rising. (Initial confidence of 5)
3. Since 2011, the bond has paid well on dividends. (Initial confidence of 7.5)
4. The bond did have a sharp decline in the first quarter of 2010 though. (Initial confidence of 10)

In stage 375, the QA system utilizes the temporal characteristics of "in two weeks," "current," "since 2011," and "in the first quarter of 2010" to generate distance values in terms of years for each of the temporal characteristics, such that for the temporal characteristic "in two weeks" would have a distance value of 0.038 years. The temporal characteristics of "current" and "since 2011" have distance values of 0 since they are up-to-date time values. Finally, the temporal characteristic of "in the first quarter of 2010" would have a distance value of 3.75 years if the current date were the end of year 2013.

In order to determine a multiplier value with which to weight the confidence scores associated with the initial candidate answers, the QA system utilizes the distance values and the following multiplier function:

$$\text{Multiplier value} = 1/(2 * \text{distance value} + 0.5)$$

Thus, the multiplier value would be 1.736 for the temporal characteristic "in two weeks," the multiplier value would be 2 for the temporal characteristics "current," the multiplier value would be 2 for the temporal characteristic "since 2011," and the multiplier value would be 0.125 for the temporal characteristics "in the first quarter of 2010."

In keeping with the example above, the QA system further attempts to identify a sentiment of the candidate answer so that the determined multiplier value may be weighted either positively or negatively. For the first answer, the QA identifies a positive sentiment by identifying the term "mature." For the second answer, the QA identifies a positive sentiment by identifying the term "value is rising." For the third answer, the QA identifies a positive sentiment by identifying the term "paid well." For the fourth answer, the QA identifies a negative sentiment by identifying the term "sharp decline." The QA system uses a +1 for a positive sentiment value and a −1 for a negative sentiment value.

Thus, the QA system provides a final weight for the candidate answer using the following distance function:

$$\text{Final Weight} = \text{Initial confidence} * \text{Multiplier Value} * \text{Sentiment Value}$$

Thus, the final weight for each candidate answers would be:

1. The bond is going to mature in two weeks. (Final weight+8.5)
2. Its current value is rising. (Final weight +10)
3. Since 2011, the bond has paid well on dividends. (Final weight+15)
4. The bond did have a sharp decline in the first quarter of 2010 though. (Final weight −1.69)

At stage 380, a final answer and confidence score, or final set of candidate answers and confidence scores, may be generated using the final weights and output to the submitter of the original input question. The set of candidate answers is output via a graphical user interface generated using the mechanisms of the illustrative embodiment, which provide the user with the tools for collaborating with the QA system to review, evaluate, and modify the listing of candidate answers and the evidence associated with these candidate answers that is evaluated by the QA system. As shown in FIG. 3, in accordance the illustrative embodiments, after stage 380, or as part of stage 380, the set of candidate answers is output via a graphical user interface generated using the mechanisms of the illustrative embodiment, which provide the user with the tools for collaborating with the QA system to review, evaluate, and modify the listing of candidate answers and the evidence associated with these candidate answers that is evaluated by the QA system.

At stage 390, the graphical user interface (GUI) that is generated comprises logic for receiving user inputs related to the evidence passages, e.g., words, phrases, sentences, and the like, for use in generating additional candidate answers and/or modifying current candidate answers. That is, via the GUI, the user may respond to a portion of the evidence passage to generate a new candidate answer and the GUI may feed that information back into the QA system pipeline 300, such as at stage 340 or 350, for use in evaluating current candidate answers and/or generating new candidate answers via the hypothesis and evidence scoring stage 350 using the various reasoning algorithms and generating relevance scores which may then be used to generate a confidence score for the newly generated candidate answer. As a result, the GUI may be updated to include the newly generated candidate answer in the portion of the GUI that outputs the ranked listing of candidate answers ranked by confidence, assuming that the confidence score for the newly generated candidate answer meets threshold requirements for depiction as a probable answer to the input question, e.g., a minimum confidence score, or may always output user generated candidate answers despite the candidate answer not meeting such threshold requirements. Similarly, the portion of the GUI that outputs the underlying evidence passages associated with candidate answers may be automatically updated to include entries for the newly generated candidate answer and its associated evidence passages.

Moreover, the GUI may include GUI elements for invoking logic and functionality of the GUI for removing evidence passages from the listing of associated evidence passages for the various candidate answers and/or modifying a relevance score associated with the evidence passage. In this way, the user essentially supersedes the evaluation made by the QA system pipeline 300 and instead imposes the user's subjective determination as to the relevance of an evidence passage by either eliminating it altogether or increasing/reducing the relevance score associated with the evidence passage to indicate the user's own subjective evaluation of the evidence passage's relevance to the candidate answer being the correct answer for the input question.

In addition, the GUI may include GUI elements for allowing a user to "drill down" within each evidence passage to obtain additional information about the source of the evidence passage. This drill down logic allows a user to select a link in the evidence passage output that results in the user being presented with information regarding the source of the evidence passage, the context in which the evidence passage is present within the source document, and the like. Thus, for example, if the user wishes to drill down to the source document to perform a more detailed analysis of the surrounding context of the evidence passage to determine whether the evidence passage is relevant to the candidate answer, or if other information may be gleaned from the context surrounding the evidence passage, then the drill down logic of the GUI may be used to achieve this. Other information that may be pertinent to the user's evaluation of the evidence passage may also be accessible via the drill-down logic including information regarding the reliability of the source document as a whole and other information for evaluating the veracity and reliability of the evidence passage.

Should the user eliminate the evidence passage or modify the evidence passage's relevance score in some manner, the QA system pipeline 300 may automatically adjust the relevance scores, confidence scores, and ranked listing of candidate answers based on the change to the evidence passage. In this way, the QA system pipeline 300 may dynamically adjust its output based on user collaboration with the QA system to provide the user's subject determination of the relevance, reliability, and correctness of the evidence passages and/or the candidate answers themselves.

With regard to the candidate answers themselves, the GUI may further provide GUI elements for eliminating candidate answers from the ranked listing of candidate answers and for providing free-form entry of new candidate answers. The GUI elements for eliminating the candidate answers, if selected, may remove the candidate answer from the ranked listing of candidate answers and may automatically result in the corresponding entries in the evidence passage portion of the GUI being removed. In this way, the candidate answer is completely removed as a candidate answer for the input question.

With regard to the free-form entry of new candidate answers, a text entry field, or the like, may be provided into which a user may type a candidate answer via a keyboard, enter via a speech-to-text mechanism, or any other way in which a user may enter a textual word, phrase, sentence, or the like. The newly entered candidate answer may be automatically added to the ranked listing of candidate answers and fed into the QA system pipeline 300, such as at stage 340 or 350, for evaluation, generation of relevance scores for extracted portions of the corpus of data/information, and generation of a confidence score for the newly generated candidate answer.

The processes described above may be done repeatedly as the user sees fit until the user is satisfied with the state of the ranked listing of candidate answers and the corresponding evidence passages associated with the candidate answers in the ranked listing of candidate answers. This information may then be stored in association with the input question, an identifier of the input question, one or more of the queries generated based on the input question, or the like, for later retrieval and use. This stored information may be used for training purposes to train the QA system, e.g., training the operation of the statistical model of the QA system, modifying weights assigned to reasoning algorithms, or the like. This information may also be used to compare results generated by the QA system when evaluating a subsequent submission of the same or similar input question in order to see how the corpus of data/information has changed over time and/or how these changes may have changed the resulting candidate answers generated by the QA system, e.g., comparing the stored candidate answers and corresponding evidence passages with the later generated candidate answers and corresponding evidence passages and identifying the differences. The stored information may also be used as a cache of sorts to provide a quick retrieval of results of similar input questions or similar queries. Other uses of the stored information may also be made based on the operation of the mechanisms of the illustrative embodiments generating this stored information.

Thus, using the mechanisms described above, or equivalent mechanisms in other QA systems generally known in the art which are augmented to include the GUI logic mechanisms of the illustrative embodiments, a system is developed that can be used to analyze natural language questions to alter the confidence scores of answers produced by a QA system based on temporal sensitivity of predicates and/or arguments associated with the predicates in the questions. One or more predicates and one or more arguments associated with the one or more predicates are required for defining temporal characteristics, because the exact object under investigation changes the semantics of temporal operators.

Figure 4:
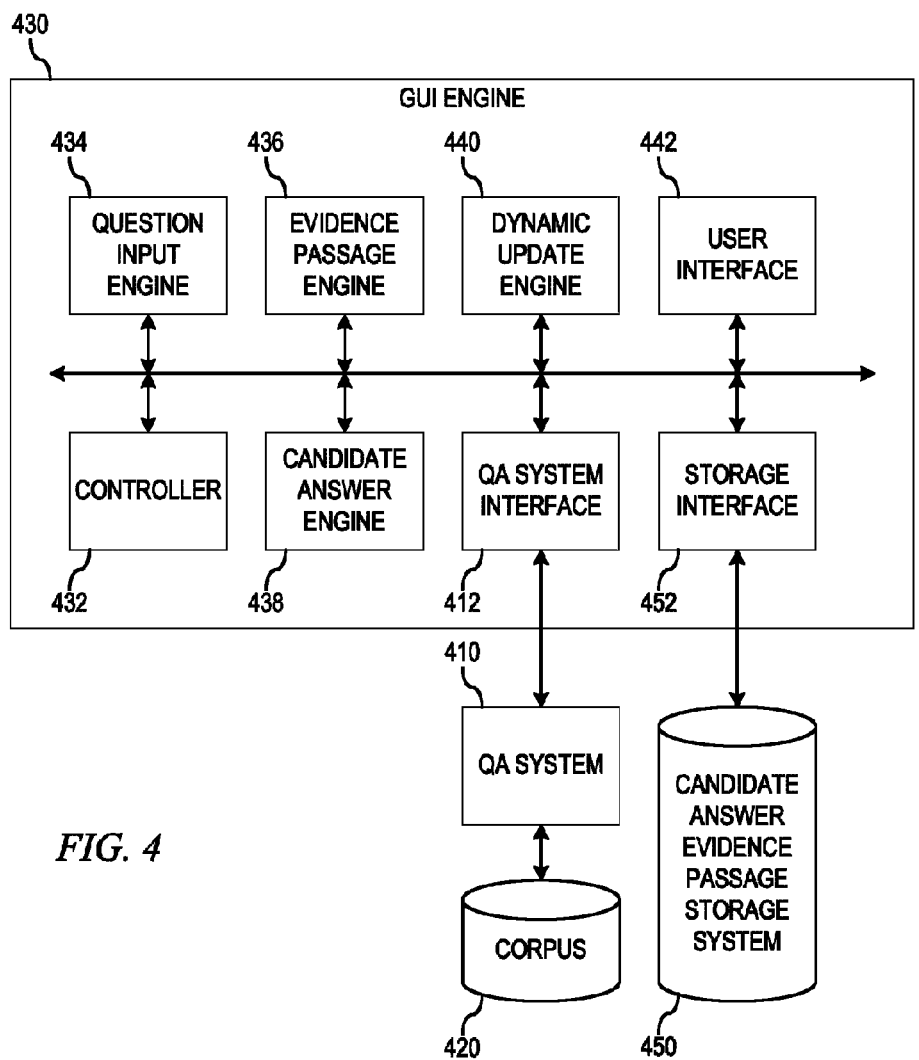
FIG. 4 is an example diagram illustrating an example block diagram of a graphical user interface engine in accordance with one illustrative embodiment.

As shown in FIG. 4, the graphical user interface (GUI) engine 430 of one illustrative embodiment interfaces with a QA system 410 via a QA system interface 412 and a candidate answer evidence passage storage system 450 via storage interface 452. The QA system 410 is any suitable QA system, such as the Watson™ QA system described above, which operates on an input question to generate candidate answers and evaluate those candidate answers for the purposes of providing one or more of the candidate answers as an actual answer for the input question. The input question may be received via the question input engine 434 of the GUI engine 430, for example. In one illustrative embodiment, the GUI engine 430 may execute on a server computing device and may be accessible by client computing devices over one or more data networks such that the GUI generated by the GUI engine 430 is rendered on a client computing device for interaction with a user and whose interactions are transmitted to the server computing device for processing. Alternatively, the GUI engine 430 may execute on the same computing device as the one operated by the user and input may be received directly from the user, via a user interface device, such as a keyboard, mouse, microphone, and/or the like.

The question input engine 434 provides fields for the user to enter an input question and may then format the question for submission to the QA system 410. Based on the input question received via the question input engine 434, the QA system 410 performs the input question parsing and analysis, critical information checking, query generation, query application and candidate answer generation, candidate answer and evidence passage evaluation, identification of missing and/or ambiguous data associated with each of the candidate answers, and scoring, etc. as previously described above. The QA system 410 operates on the corpus of data/information 420 to generate the candidate answers (hypotheses), identify missing and/or ambiguous information that could improve or discount the candidate answers, retrieve evidence passages, and perform the various evaluations previously described. The result of the QA system 410 operations is a set of candidate answers, related missing and/or ambiguous information associated with the candidate answers, evidence passages associated with the candidate answers, and corresponding relevance and confidence scores which may all be stored in the candidate answer evidence passage storage system 450. Moreover, this information may further include links to the source documents in the corpus 420 and other information regarding the veracity and relevancy of the source documents.

The GUI engine 430 further comprises a controller 432, an evidence passage engine 436, a candidate answer engine 438, a dynamic update engine 440, and a user interface 442. The controller 432 controls the overall operation of the GUI engine 430 and comprises logic for coordinating and orchestrating the operation of the other elements of the GUI engine 430 as well as the interfacing of the GUI engine 430 with the QA system 410 and the candidate answer evidence passage storage system 450. The candidate answer engine 438 comprises logic for generating and outputting a portion of a GUI for presenting the candidate answers as well as related missing and/or ambiguous information associated with the candidate answers generated by the QA system 410 or input by a user via the user interface 442, where such input may be a free-form entry of a candidate answer or selection of a sub-portion of an evidence passage, for example, as previously discussed above. The candidate answer portion of the GUI generated by the candidate answer engine 438 may include a ranked listing of the candidate answers organized by increasing/decreasing confidence score as well as one or more missing and/or ambiguous pieces information associated with the candidate answers, if any, with associated GUI elements to provide additional information or eliminate one or more candidate answers from the ranked listing of candidate answers. As mentioned above, in one or more illustrative embodiments, the rankings may be modified based on user input in that user entered or selected candidate answers may be included in the ranked listing of candidate answers despite their particular confidence score but may still be listed in a ranked position based on their confidence score, i.e. even though a user entered candidate answer may not satisfy minimum requirements for inclusion in the ranked listing of candidate answers, it may still be included in the ranked listing but is listed in a position corresponding to its relative confidence score.

The candidate answer engine 438 may further generate GUI elements in association with the candidate answer entries in the GUI that may be selected for providing additional information to the ranked listing of candidate answers or eliminating the candidate answers from the ranked listing of candidate answers. The GUI element, when selected by a user, as indicated in user input received via the user interface 442, causes the corresponding candidate answer to be updated or removed from the ranked listing of candidate answers. Moreover, the corresponding entries for evidence passages in the evidence passage portion of the GUI may be automatically updated to reflect the refinement to the candidate answer or removal of the candidate answer. The ranked listing of candidate answers may also be dynamically updated to re-evaluate the rankings of candidate answers based on the refinement of the candidate answer or the removal of a candidate answer from the ranked listing.

The evidence passage engine 436 comprises logic for generating a portion of the GUI output that lists the evidence passage contributing to the confidence score for each individual candidate answer. That is, the evidence passage portion of the GUI may be organized by candidate answer with the evidence passages contributing to the confidence score of the candidate answer being displayed in association with the candidate answer. The output of the evidence passages in the evidence passage portion of the GUI is done such that sub-portions of the evidence passages, e.g., words, phrases, sentences, and the like, are selectable by a user via the user interface 442 and the user's own user interface input devices, e.g., keyboard, mouse, microphone, etc., so as to create new candidate answers that are automatically added to the ranked listing of candidate answers in response to such selection.

The entries for the evidence passages that are output via the evidence portion of the GUI, as generated by the evidence passage engine 436, may include a representation of the evidence portion and an associated relevance score for the evidence portion as generated by the evaluations performed by the QA system 410. Moreover, the entries may include links to the source documents for the evidence passages for purpose of implementing the drill-down functionality previously described. The drill-down functionality may be facilitated by logic provided in the evidence passage engine 436 which is invoked in response to user input being received via the user interface 442 selecting the link in the entry for the evidence passage.

Moreover, the evidence passage engine 436 generates the evidence passage portion of the GUI with GUI elements for modifying the corresponding relevance scores associated with the evidence passages based on user input. In response to a user providing a user input via the user interface 442 that selects a GUI element for removing an evidence passage, the corresponding evidence passage is eliminated from the GUI output and the change is submitted to the QA system 410 for dynamic re-evaluation of the candidate answers. Similarly, in response to the user providing a user input for providing additional information pertaining to the evidence passage, the change is communicated to the QA system 410 which may dynamically re-evaluate the candidate answers based on the received change.

The dynamic update engine 440 comprises logic for coordinating the user modifications and selections of GUI elements received via the user interface 442. This may involve coordinating the updating of the evidence passage portion and candidate answer portions of the GUI as well as the submission of the modifications to the QA system 410 for re-evaluation of the candidate answers and/or evidence passages associated with the candidate answers. The resulting candidate answers and associated evidence passages generated via the operation of the QA system 410 and the user collaboration provided via the GUI engine 430 may be stored in the candidate answer evidence passage storage system 450 for later retrieval and use.

Figure 5:
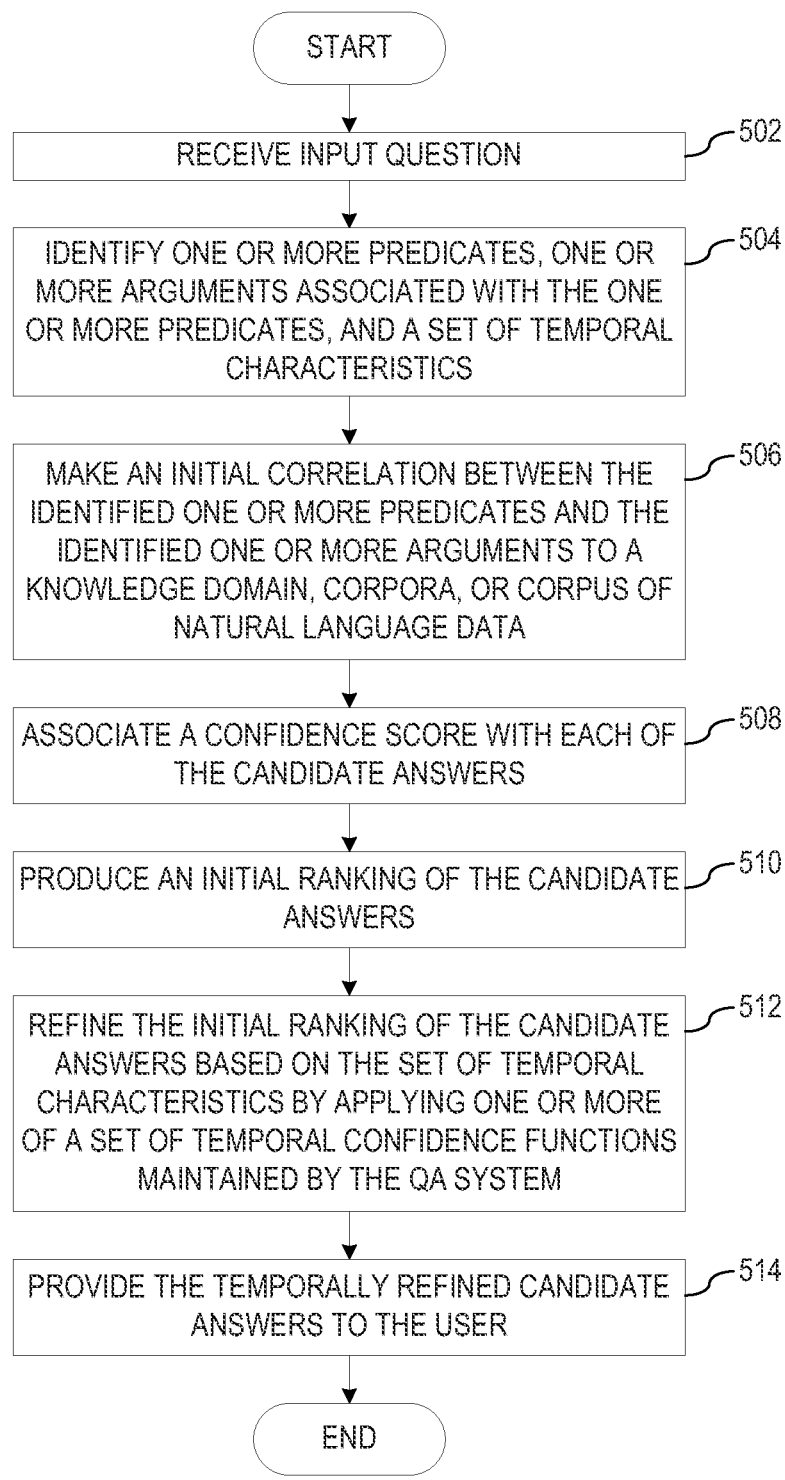
FIG. 5 is a flowchart outlining an example operation for refining candidate answers using temporal characteristics identified from an initial question in accordance with an illustrative embodiment.

FIG. 5 is a flowchart outlining an example operation for refining candidate answers using temporal characteristics identified from an initial question in accordance with an illustrative embodiment. As the operation begins, the QA system receives an input question from a user (step 502). The QA system parses the question using natural language processing (NLP) for semantic keywords identifying one or more predicates, one or more arguments associated with the one or more predicates, and a set of temporal characteristics (step 504). The QA system makes an initial correlation between the identified one or more predicates and the identified one or more arguments associated with the one or more predicates to a knowledge domain, corpora, or corpus of natural language data in order to identify a collection of candidate answers (step 506). The QA system associates a confidence score with each of the candidate answers (step 508). That is, the QA system analyzes each candidate answer as to how close to the candidate answer matches a set of criteria, which is the identified one or more predicates and the identified one or more arguments associated with the one or more predicates. The QA system then produces an initial ranking of the candidate answers (step 510).

In order to refine the initial ranking of the candidate answers based on the set of temporal characteristics, the QA system applies one or more of a set of temporal confidence functions maintained by the QA system (step 512). The QA system applies one or more of the set of temporal confidence functions, computed against the temporal interval between a reference time, i.e. the set of temporal characteristics identified from the question and a date/time stamp associated with the candidate answers. The QA system may then provide the temporally refined candidate answers to the user (step 514), with the operation ending thereafter.

Figure 6:
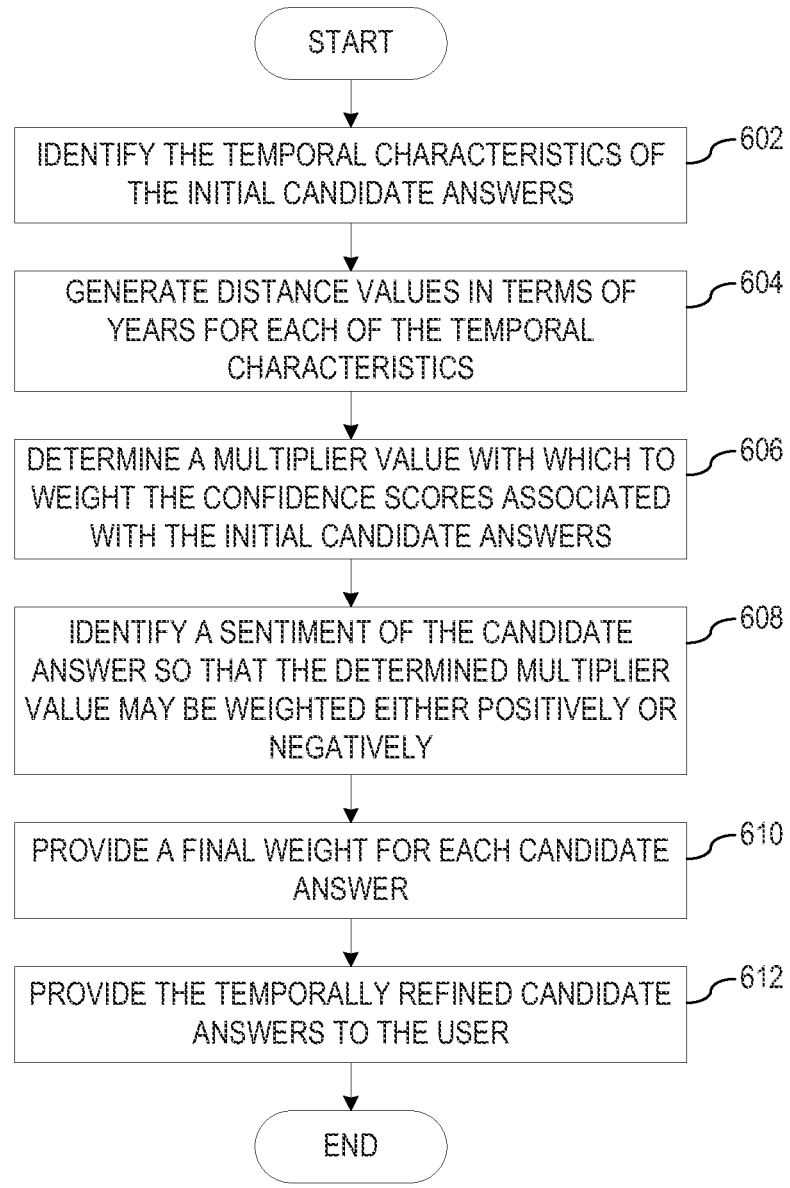
FIG. 6 is a flowchart outlining an example operation for recomputing the rank of each of the candidate answers using a distance function based on the temporal semantics found both in the question and the candidate answer text, as well as a relation of the question and candidate answer to the present time in accordance with an illustrative embodiment.

FIG. 6 is a flowchart outlining an example operation for recomputing the rank of each of the candidate answers using a distance function based on the temporal semantics found both in the question and the candidate answer text, as well as a relation of the question and candidate answer to the present time in accordance with an illustrative embodiment. As the operation begins, the QA system identifies the temporal characteristics of the initial candidate answers (step 602). Based on a reference time associated with the submitted question, the QA system generates distance values in terms of years for each of the temporal characteristics (step 604). Using the distance values, the QA system determines a multiplier value with which to weight the confidence scores associated with the initial candidate answers (step 606) using the following multiplier function:

$$\text{Multiplier value} = 1/(2 * \text{distance value} + 0.5)$$

The QA system identifies a sentiment of the candidate answer so that the determined multiplier value may be weighted either positively or negatively (step 608). The QA system provides a final weight for each candidate answer (step 610) using the following distance function:

$$\text{Final Weight} = \text{Initial confidence} * \text{Multiplier Value} * \text{Sentiment Value}$$

The QA system then provides the temporally refined candidate answers to the user (step 612), with the operation ending thereafter.

As noted above, it should be appreciated that the illustrative embodiments may take the form of an entirely hardware embodiment, an entirely software embodiment, or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed on a computing device, causes the computing device to:

responsive to receiving an input question, identify a set of candidate answers from a knowledge domain based on a correlation between an identified one or more predicates and an identified one or more arguments associated with the one or more predicates from the input question;

associate an initial confidence score with each candidate answer of the set of candidate answers;

refine each initial confidence score associated with each candidate answer based on a set of temporal characteristics identified in the input question, wherein each confidence score associated with each candidate answer is refined based on the set of temporal characteristics using a reference time of the input question and a respective reference time associated with the candidate answer thereby forming a temporally refined confidence score associated with the candidate answer, wherein the temporally refined confidence score associated with the candidate answer is identified by:

generating a distance value in terms of years for the respective reference time associated with the candidate answer and the reference time of the input question;

using the distance value, determining a multiplier value with which to weight the confidence score associated with the candidate answer using multiplier function: multiplier value=1/(2*distance value+0.5);

identifying a sentiment value of the candidate answer to weight the determined multiplier value either positively or negatively; and providing a final weight for the temporally refined confidence score associated with the candidate answer using distance function: final weight=initial confidence score*multiplier value*sentiment value; and provide a set of candidate answers with the temporally refined confidence scores to the user.

2. The computer program product of claim 1, wherein the reference time of the input question is identified from the set of temporal characteristics.

3. The computer program product of claim 1, wherein in the reference time of the input question is a current time if no temporal characteristics are identifiable in the input question.

4. An apparatus comprising:
a processor; and
a memory coupled to the processor, wherein the memory comprises instructions which, when executed by the processor, cause the processor to:

responsive to receiving an input question, identify a set of candidate answers from a knowledge domain based on a correlation between an identified one or more predicates and an identified one or more arguments associated with the one or more predicates from the input question;

associate an initial confidence score with each candidate answer of the set of candidate answers;

refine each initial confidence score associated with each candidate answer based on a set of temporal characteristics identified in the input question, wherein each confidence score associated with each candidate answer is refined based on the set of temporal characteristics using a reference time of the input question and a respective reference time associated with the candidate answer thereby forming a temporally refined confidence score associated with the candidate answer, wherein the temporally refined confidence score associated with the candidate answer is identified by:

generating a distance value in terms of years for the respective reference time associated with the candidate answer and the reference time of the input question;

using the distance value, determining a multiplier value with which to weight the confidence score associated with the candidate answer using multiplier function: multiplier value=1/(2*distance value+0.5);

identifying a sentiment value of the candidate answer to weight the determined multiplier value either positively or negatively; and providing a final weight for the temporally refined confidence score associated with the candidate answer using distance function: final weight=initial confidence score*multiplier value*sentiment value; and provide a set of candidate answers with the temporally refined confidence scores to the user.

5. The apparatus of claim 4, wherein the reference time of the input question is identified from the set of temporal characteristics.

6. The apparatus of claim 4, wherein in the reference time of the input question is a current time if no temporal characteristics are identifiable in the input question.

* * * * *